United States Patent [19]
Jegousse et al.

[11] 4,319,709
[45] Mar. 16, 1982

[54] POSITIONING OF AN ADDITIONAL TUBULAR ELEMENT ON A TUBULAR STRUCTURE

[75] Inventors: Michel J. Jegousse, Nantes; Bruno J. M. De Sivry, Neuilly, both of France

[73] Assignee: Compagnie Francaise des Petroles, Paris, France

[21] Appl. No.: 98,443

[22] Filed: Nov. 29, 1979

[30] Foreign Application Priority Data

Nov. 29, 1978 [FR] France ................................ 78 33660

[51] Int. Cl.³ ............................................ B23K 28/02
[52] U.S. Cl. .................................. 228/213; 228/6 R; 228/44.5; 228/49 B
[58] Field of Search ............... 228/213, 4.1, 6 R, 44.5, 228/49 B; 29/464

[56] References Cited
U.S. PATENT DOCUMENTS 3,658,231 4/1972 Gilman ............................... 228/44.5
3,711,938 1/1973 Warren et al. ....................... 228/5.1
3,741,457 6/1973 Gwin et al. .......................... 228/44.5
3,944,202 3/1976 Dearman ............................ 228/49 B

*Primary Examiner*—John McQuade
*Attorney, Agent, or Firm*—Sughrue, Mion, Zinn, Macpeak and Seas

[57] ABSTRACT

In the positioning of an additional tubular element, e.g. a pipe section, on a tubular structure, e.g. a pipe-line in the course of immersion, where the end surfaces to be brought into contact are not in radial planes, the additional element is brought in alignment with the structure and at a short distance from the latter. The end surfaces of the element and structure are then brought into contact, the contacting ends are centered, and a compressive force is applied to them in such a way that the element can pivot about the point of contact between the element and the structure until its end surface is brought into complete contact with the end surface of the structure.

10 Claims, 3 Drawing Figures

4,319,709

POSITIONING OF AN ADDITIONAL TUBULAR ELEMENT ON A TUBULAR STRUCTURE

BACKGROUND OF THE INVENTION

The present invention relates to the positioning of an additional tubular element on a tubular structure which may be subject to a random movement and where the planes of the end surfaces of the structure and of the additional element to be brought into contact have slight angular deviations with reference to each other and with reference to the corresponding theoretical planes orthogonal to the respective longitudinal axes of the structure and the additional element.

Since the aim is to make the two confronting end surfaces coincide, there are two difficulties due to the particular conditions involved.

With regard to the angular deviations mentioned, it will be understood that they may constitute the major obstacle to correct positioning, i.e. to realising simultaneously the coincidence of the end surfaces and the alignment of the axis of the additional element with that of the original structure.

The problems produced by angular deviations in the end surfaces can, in certain cases, be overcome, where the ends of the element and of the structure are to be welded together, after positioning. If the welding process adopted is welding by high-frequency electric current and if the additional element is applied to the structure with a high compressive force, this has the effect of causing upsetting of the material, as occurs during forging, so as to bring the two end surfaces into coincidence, respecting as far as possible the coaxiality of the additional element relative to the structure. Such a method may also be applied even in cases where strict coaxiality of the element and the structure is not essential. It will be appreciated that whatever the welding process adopted, and more particularly where electron beam welding is involved, the primordial condition for good assembly remains the realisation of perfect coincidence between the end surfaces in contact. This is also so in the case of assembly by screwing.

With the regard to the movements to which the original structure may be subject, they are likewise such as to compromise the success of the assembly operation, without considering the damage which might result to the components involved. From this point of view, it is necessary to ensure good retention of the element relative to the structure to enable risks associated with relative random movement to be avoided.

SUMMARY OF THE INVENTION

According to one aspect of the present invention there is provided a method of positioning an additional tubular element on a tubular structure subject to random movement, the planes of the confronting end surfaces of the ends of said structure and of said additional element having slight angular deviations with reference to each other and to the corresponding theoretical planes orthogonal to the respective longitudinal axes of said structure and of said additional element, said method comprising bringing said additional element to a position in which it is substantially coaxial relative to said end of said structure and in which said end surface thereof is in contact with said end surface of said structure, contact there between occurring at the closest points of said end surfaces, exerting a compressive force across said contacting end surfaces adjacent said end surfaces, and simultaneously centering said end surfaces relative one to another and laterally guiding said additional element, such that said additional element inclines relative to said structure to completely apply said end surface thereof against said surface of said structure.

Said structure may, by way of example only, have, at least in its region adjacent its said end surface, which is uppermost, a nearly vertical position, said additional element being initially positioned with its lower end adjacent said upper end of the structure and substantially contiguous therewith. Said structure may for example be a pipeline in the process of being laid on the sea bed from a floating structure, and said additional element may be an additional pipeline section to be assembled there with.

Said additional element is then brought into general alignment with said structure with which it is to be assembled, said upper end of said structure and said lower end of said element then being a certain distance from one another and substantially coaxial.

The additional element may be suspended in this position by any suitable known means while, as will be described, guide means may be arranged in a region near the upper end of said element for guiding said element laterally whilst permitting axial movement thereof. The element is then moved towards said structure until contact is established between said end surfaces of said structure and said element. It is at this stage that the compressive force is applied and in such a way as to permit the additional element to incline relative to said structure. The upper end of said additional element is guided by means such that the upper end can incline relative to the lower end, and the lower end of said additional element is maintained centered on the upper end of said structure. The compressive force is applied at at least three angularly spaced points.

The above arrangement results firstly in a rocking movement of said additional element about an axis passing through said point of contact of said two end surfaces producing complete coincidence of said surfaces with each other. It may also result in a vigorous locking of said element to said structure, which will enable the unwelcome consequences, which movements to which the structure may be subject could have upon the sequence to operations, to be avoided.

Correct centering of said additional element with reference to said structure is perferably ensured from the interior of both said structure and said element and said centering may be maintained until completion of any assembly operations which may be performed after the positioning process is complete.

The compressive forces are advantageously applied in regions near the ends of said structure and said element.

Preferably during the rocking of said element, the guide means follow the corresponding movements of the upper part of the said element and, when the two end surfaces of said element and said structure have been brought into coincidence, said guide means are locked in position, while still leaving said element free to move axially. This having been done, said compressive forces exerted on the end surfaces may be relieved.

This is particularly indicated in cases where, after positioning, it is proposed to assemble said element with said structure by high-frequency welding. It is, in fact, advantageous in this case to try to increase the skin effect due to the high-frequency current, this current appearing at the surfaces of the ends of said structure and said element; to this end, whilst continuing the high-frequency heating, said additional element may be raised by a certain distance parallel to itself, and such movement not modifying the balance of the forces present. Then, after having maintained said additional element in this raised position for a sufficient time, said element is lowered again and a powerful compression is again applied at the level of the contacting end surfaces, to cause the upsetting of the material already mentioned, this upsetting being akin to that obtained during a forging operation.

However, in comparatively favourable cases high-frequency welding may be undertaken directly, without previous raising of said element, but by exerting, as before, a more vigorous compression after welding, with the same result as described above.

According to another aspect of the invention there is provided apparatus for use in carrying out the above described method, the apparatus comprising guide means for laterally guiding said additional element while permitting inclination thereof, said guide means being arranged in the region of the upper end of the said additional element remote from said structure, means for exerting compressive force on said additional element and said structure and tending to bring said element and said structure together, and centering means for centering said additional element relative to said structure, adapted to be arranged in the region of said end surfaces thereof, and permitting inclination of said element relative to said structure.

No description will be given hereinbelow of the means, which are known per se, by which said additional element is brought into alignment with said structure. In this position, said additional element is generally located a certain distance from said structure.

As already explained, lateral guiding means, e.g. hydraulic stops, are provided in the region near the upper end of said additional element for maintaining said additional element in position in spite of the possible random movements, and also for supporting the component, perpendicular to the axis of said element, of the weight of said element, which necessarily deviates from the vertical. The stops are, however, arranged to permit movement of said element along its axis. They also permit a certain lateral movement of the upper part of said element during the rocking movement of said element. They may however be locked after said additional element has assumed its final position, while still allowing said additional element to move in the direction of its axis.

The means for exerting a compressive force on said additional element and said structure may comprise two beams adapted to be fixed respectively to said structure and said additional element adjacent the ends thereof to be brought into contact, said beams being interconnected by a plurality of jacks regularly arranged around the circumferences of said beams and mounted on said beams so as to permit inclination of said additional element relative to said structure. Preferably the jacks are articulated at their ends to the respective beams.

In operation, said cross-beams are fixed to the respective ends of said additional element and said structure and said additional element is then moved towards said structure until contact is made between the closest points of the two confronting end surfaces. The two beams are then joined together by said jacks. The jacks are then activated and the simultaneous action of all of them produces rocking of said additional element on said structure until said two end surfaces are brought into full contact, and then, if desired, compression of said additional element against said structure, as has already been described.

Said guide means may comprise, in respect of each stop, means for contacting said additional element, e.g. an idler roller, rotatable about an axis which is substantially orthogonal to that of said element, so that axial movement of said element can occur substantially without friction.

An embodiment of the apparatus according to the present invention will now be described, by way of example only, with reference to the accompanying drawings.

DETAILED DESCRIPTION OF THE PREFERRED EMBODIMENTS

Figure 1:
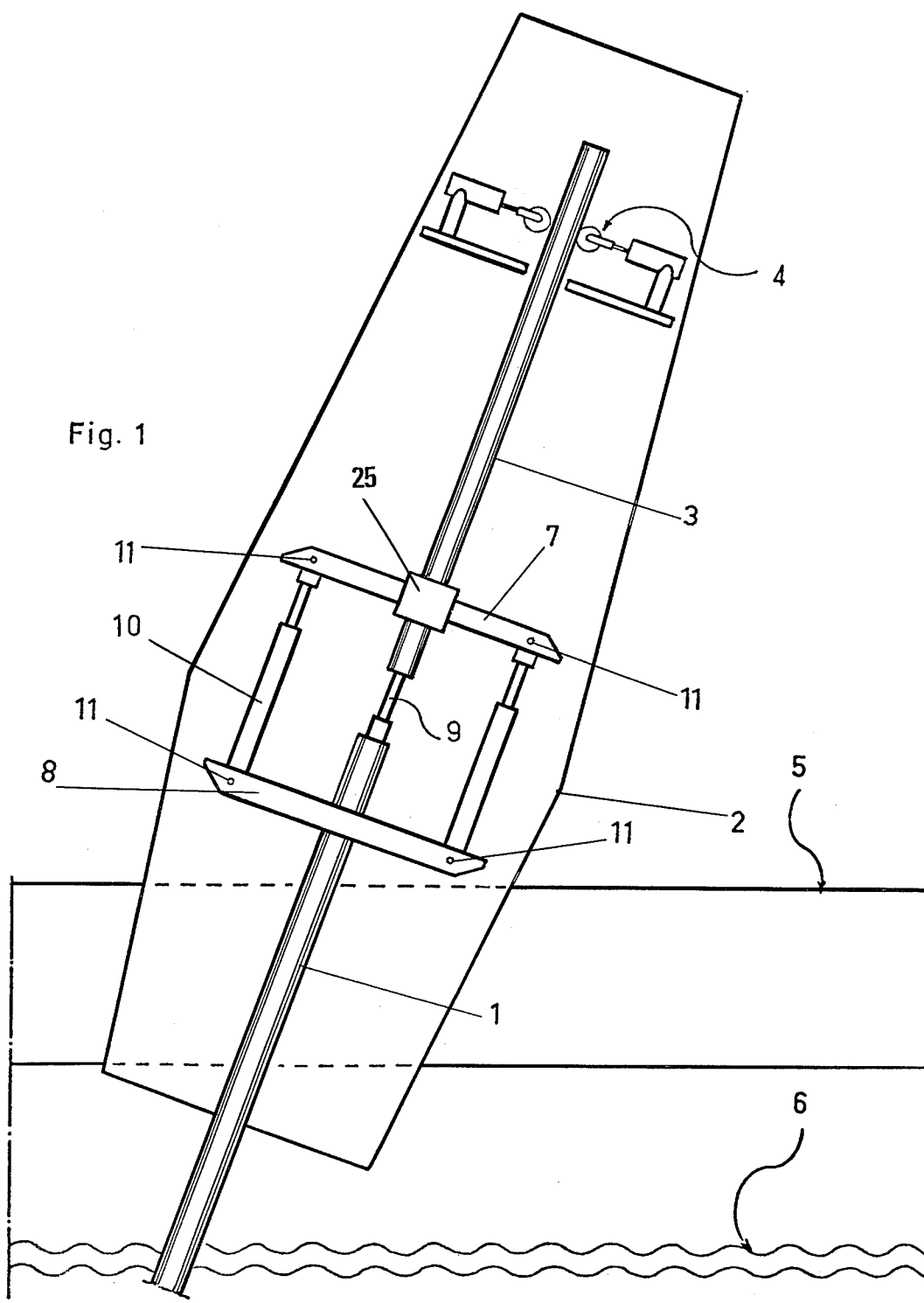
FIG. 1 is a schematic vertical section through an embodiment of the apparatus according to the invention, for positioning an additional pipe element on a structure constituted by a pipe in the course of immersion.

In FIG. 1 there is shown, very schematically, the upper end of a tubular structure 1 which is, in this embodiment, a pipe in the course of immersion from a floating platform 5. The end of the structure 1 is supported in a frame 2 made integral with the platform 5. The water level is shown at 6.

Figure 2:
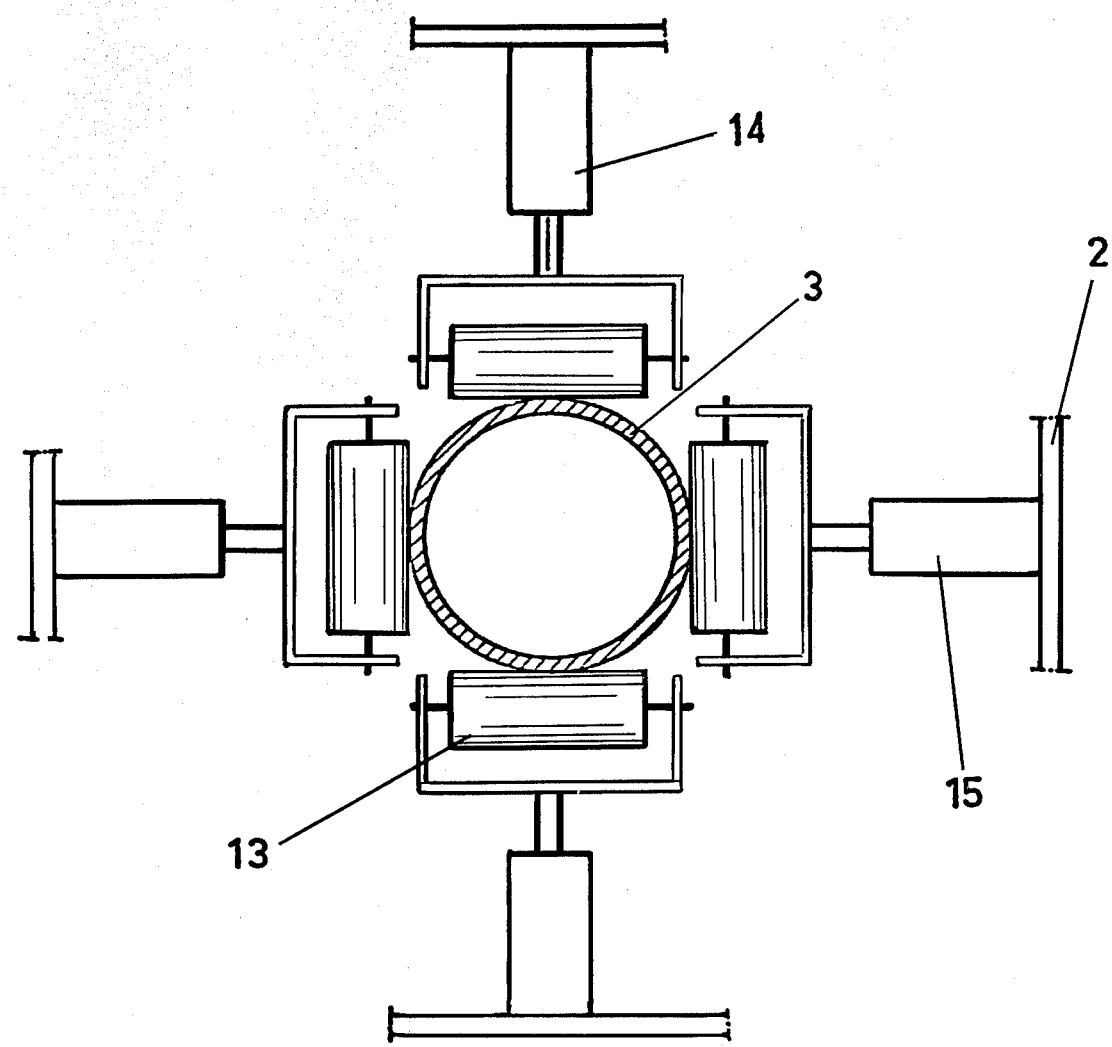
FIG. 2 shows a schematic cross-section through lateral guide mean for maintaining the upper end of said additional element in position.

An additional pipe element 3 is to be positioned on, and eventually assembled with, the end of the structure 1. The element 3 is illustrated in a position close to alignment, with two beams 7 and 8, and a centering device 9 being in place. The beams 7 and 8 are fixed to the element and the structure respectively adjacent the ends to be assembled, and are interconnected by at least 3 jacks 10 regularly spaced apart around the beams and articulated to the beams at points 11. The jacks 10 are supplied with a common fluid under pressure which causes the surface of the lower end of the element 3 to come into contact with the surface of the upper end of the structure 1 and then to pivot about its point of contact to bring the end surface of the element 3 into coincidence with the end surface of the structure 1. The apparatus also comprises retaining and guide means 4 adjacent the upper end of element 3. An embodiment of these means is shown in FIG. 2 and comprises idler rollers 13 each of which is associated with a stop 15 which bears against an element of the frame 2. As shown, the rollers 13 are arranged symmetrically with reference to the element 3 and bear upon four points, arranged in a cross, of the external surface of the element 3. The stops 15 may for example be jacks which may be supplied with a common fluid under pressure or may be short-circuited together in opposite pairs and having opposite effects, for following the movements of inclination of the element 3.

A mutually opposed pair of rollers and their associated stops may serve as weight-compensating means, whilst the other pair may serve as anti-rolling stops where a submerged pipe is involved.

It is, however, self-evident that the number and arrangement of the rollers and stops may be varied according to requirements.

Figure 3:
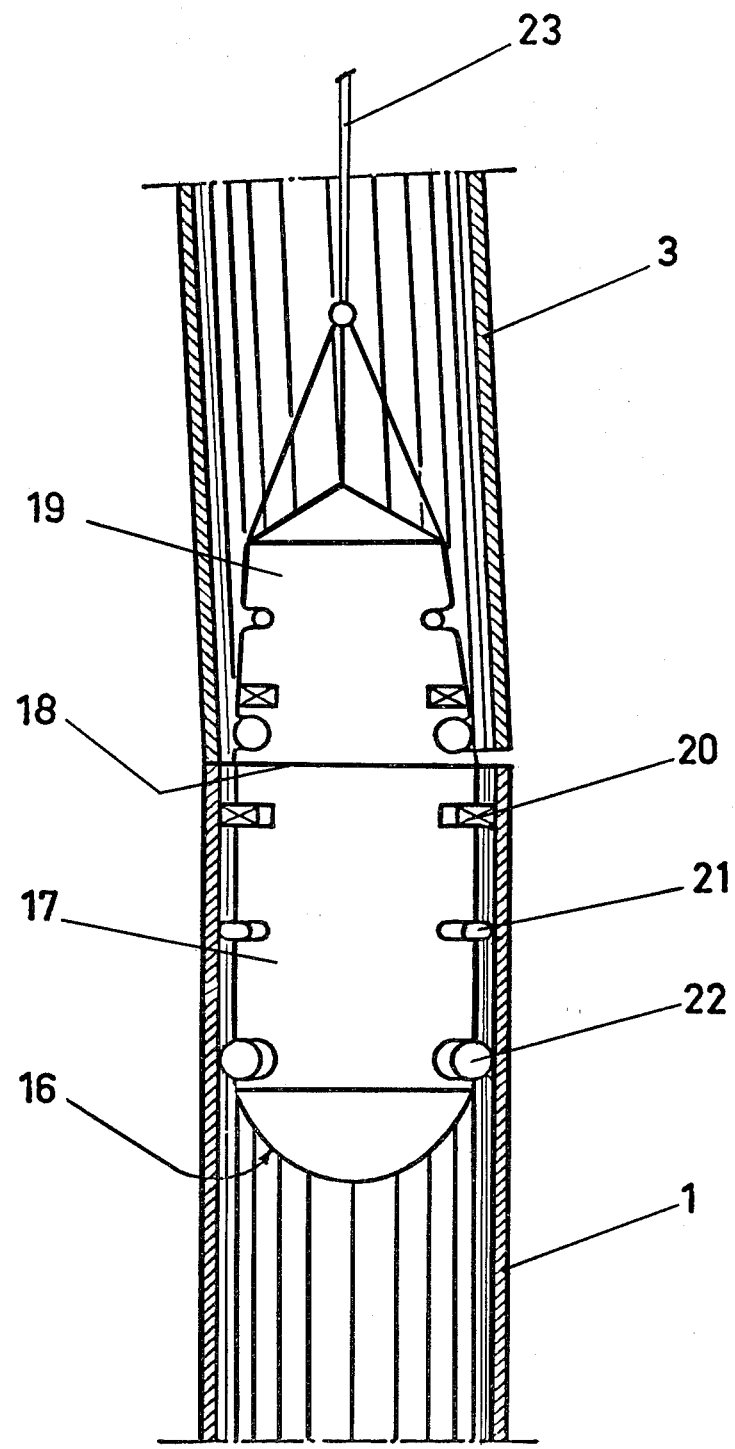
FIG. 3 shows in schematic vertical section a centering means for use according to the present invention.

An embodiment of the centering device 9 is shown in FIG. 3 and comprises a body 16, for example of steel, the lower part 17 of which, located beneath the joint plane 18, is cylindrical with a slightly smaller diameter than that of the end of the structure 1. The part 19 of the body 16 arranged above the joint plane 18 has a reduced section and is slightly conical at least at its junction with part 17 so as to permit the inclination of the additional element 3 on the end of the structure 1. Alternatively an exterior centering device may be used, the device being flared in its upper part surrounding the element 3.

The centering device is equipped with sectorial contact shoes 20, with toroidal seal elements 21, which may for example be of the inflatable type, and rolling wheels 22. The shoes, seals and wheels are moveable between operative positions and inoperative positions in which they are retracted into their respective housings in the body 16.

The centering device is suspended by means of a cable 23, with which the pipelines for the supply and remote control of the shoes, seals and wheels described above may be associated.

If it is desired to effect a connection by screwing or friction welding, additional means for rotating the additional element may be provided. In the case of assembly by screwing, compression is removed during rotation whereas in the case of friction welding, compression is maintained during rotation.

The additional rotatable means may be a rotatable gripping device which engages and rotates the additional element. The gripping device could, for example, be mounted in part 25 of beam 7. Such a rotatable gripping device is known in drilling and will differ according to the diameter of the pipe to be inserted. The gripping device could additionally serve to conduct electric welding current.

Friction welding requires interior and exterior scraping devices for removing bulges formed during welding. The interior scraping device may be mounted on the centering device 16 and the exterior scraping device may be activated by a jack bearing on the beam 8.

It is self-evident that the present invention is not intended to be limited to the embodiment which has just been described; modifications of detail may be made to it without thereby departing from the scope of the invention.

It will also be appreciated that while the invention has been described in terms of a structure having a vertical upper end and substantially vertical additional element, the orientation of the structure and element may vary.

What is claimed is:

1. A method of positioning an additional tubular element on a tubular structure subject to random movement, the planes of the confronting end surfaces of the ends of said structure and of said additional element having slight angular deviations with reference to each other and to the corresponding theoretical planes orthogonal to the respective longitudinal axes of said structure and of said additional element, said method comprising bringing said additional element to a position in which it is substantially coaxial relative to said end of said structure and in which said end surface thereof is in contact with said end surface of said structure, contact there between occurring at the closest points of said end surfaces, exerting a compressive force across said contacting end surfaces adjacent said end surfaces, and simultaneously centering said end surfaces relative one to another from the interior of said structure and said additional element and laterally guiding said additional element, such that said additional element inclines relative to said structure to completely apply said end surface thereof against said end surface of said structure.

2. A method according to claim 1, wherein after complete application of said end surface of the said additional element to said end surface of said structure, said additional element is locked laterally in its position.

3. A method according to claim 2, wherein said lateral locking of said additional element is such as to permit axial movement thereof and, thereafter, said compressive force is released before welding of said element to said structure is effected.

4. A method according to claim 1, wherein after complete application of said end surface of said additional element to said end surface of said structure, said additional element is rotated.

5. A method of positioning an additional tubular element on a tubular structure subject to random movement wherein the planes of the confronting cross sections of the ends of said structure and of said additional element have slight angular deviations with reference to each other and to the corresponding theoretical planes orthogonal to the respective longitudinal axes of said structure and of said additional element, the method comprising bringing said end of said additional element, previously placed in a substantially coaxial position relative to said end of said structure, into contact with said end of said structure, contact occurring at the two closest points of said cross-sections of said ends, and exerting compressive stresses upon said contacting ends of said structure and said additional element in substantially coaxial directions and in regions near said ends, causing said additional element to rock about an axis passing through said point of contact of said ends so as to bring said end of said additional element into complete contact with said structure and locking said additional element and said structure together, irrespectively of movements of said structure, and, simultaneously, effecting centering of said additional element from the interior thereof.

6. A method according to claim 5, including, after said locking and centering, relieving said compressive stress exerted on said contacting ends of said structure and said additional element.

7. A method as claimed in claim 5, wherein said structure is a pipeline in the course of immersion and said additional element is a pipe element to be attached thereto, said end of said pipeline being an upper end of an end part thereof having an axis inclined to the vertical and said pipe element being initially suspended in substantially coaxial position relatiave to said upper end part of said pipeline.

8. A method as claimed in claim 5, further comprising the further step of welding said element to said structure, after the centering thereof.

9. A method according to claim 8, wherein, prior to welding, said compressive stresses are relieved, and after welding, compressive stresses are re-exerted on said contacting ends of said structure and said additional element.

10. A method according to claim 9, wherein said welding comprises high frequency welding and, during welding, said contacting ends are moved apart and then brought back into contact.

* * * * *